(12) United States Patent
Nakamura et al.

(10) Patent No.: US 10,929,970 B2
(45) Date of Patent: Feb. 23, 2021

(54) COMPONENT MOUNTING SYSTEM AND TRACE DATA ACQUISITION METHOD

(71) Applicant: Panasonic Intellectual Property Management Co., Ltd., Osaka (JP)

(72) Inventors: Mitsuo Nakamura, Fukuoka (JP); Syoichi Nishi, Fukuoka (JP); Noboru Higashi, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 109 days.

(21) Appl. No.: 16/243,153

(22) Filed: Jan. 9, 2019

(65) Prior Publication Data

US 2019/0228520 A1 Jul. 25, 2019

(30) Foreign Application Priority Data

Jan. 22, 2018 (JP) .............................. JP2018-007767
Jan. 22, 2018 (JP) .............................. JP2018-007770

(51) Int. Cl.
*G06T 7/00* (2017.01)
*G06K 9/20* (2006.01)
*G06K 9/03* (2006.01)
*G06K 9/00* (2006.01)

(52) U.S. Cl.
CPC ........ *G06T 7/0004* (2013.01); *G06K 9/00201* (2013.01); *G06K 9/033* (2013.01); *G06K 9/2063* (2013.01); *G06K 9/2081* (2013.01); *G06K 2209/01* (2013.01); *G06T 2207/30141* (2013.01)

(58) Field of Classification Search
None
See application file for complete search history.

(56) References Cited

U.S. PATENT DOCUMENTS

| | | | |
|---|---|---|---|
| 2006/0020361 A1* | 1/2006 | Ohishi | H05K 13/084 700/115 |
| 2014/0270473 A1* | 9/2014 | Youngquist | H05K 13/085 382/147 |
| 2018/0049353 A1* | 2/2018 | Michizoe | H05K 13/0419 |
| 2018/0049356 A1* | 2/2018 | Mori | G05B 19/41875 |
| 2018/0096231 A1* | 4/2018 | Bhat | G06K 9/6282 |

FOREIGN PATENT DOCUMENTS

| | | | |
|---|---|---|---|
| CN | 102348369 A | * | 2/2012 |
| CN | 103298325 A | * | 9/2013 |
| JP | 2002279342 A | * | 9/2002 |
| JP | 2008282964 A | * | 11/2008 |
| JP | 2013-115337 | | 6/2013 |

* cited by examiner

Primary Examiner — Samah A Beg
(74) Attorney, Agent, or Firm — Pearne & Gordon LLP

(57) ABSTRACT

A component mounting system includes a component mounter, and a server. The component mounter includes a component information recognizer, and a data output unit. The component information recognizer recognizes component information by imaging a character of the component information printed on a surface of a component. The data output unit outputs the component information together with board information to the server, the component information being recognized by the component information recognizer, the board information being information of a board on which the component is installed.

11 Claims, 11 Drawing Sheets

FIG. 11A

TRACE DATABASE (3a)

| BOARD ID (51) | DATE OF MANUFACTURE (52) | PRODUCT SERIAL NUMBER (53) | COMPONENT NAME (54) | LOT NUMBER (55) |
|---|---|---|---|---|
| AAAA | 2017/10/01 10:00:00 | 111111 | P11 P13 P14 | L11 L12 L13 |
| BBBB | 2017/10/01 10:10:00 | 222222 | P21 P23 P24 | L21 L22 L23 |
| CCCC | 2017/10/01 10:20:00 | 333333 | P31 P33 P34 | L31 L32 L33 |

(50 indicates row)

FIG. 11B

| SEARCH KEY INPUT ITEM (56) | |
|---|---|
| COMPONENT NAME (56a) | * * * |
| LOT NUMBER (56b) | * * * |

FIG. 11C

SEARCH RESULT OUTPUT (57)

| BOARD ID (51) | DATE OF MANUFACTURE (52) | PRODUCT SERIAL NUMBER (53) |
|---|---|---|
| EEEE | 2017/10/01 10:00:00 | 123455 |
| FFFF | 2017/10/01 10:10:00 | 123457 |
| GGGG | 2017/10/01 10:20:00 | 123460 |

(50* indicates row)

COMPONENT MOUNTING SYSTEM AND TRACE DATA ACQUISITION METHOD

BACKGROUND

1. Technical Field

The present disclosure relates to a component mounting system for mounting a component on a board and a trace data acquisition method for acquiring production history data in a component mounting system.

2. Description of the Related Art

In recent years, in an electronic device manufacturing industry, it is required to ensure so-called traceability that enables quality control in individual products as well as retroactive pursuit of a production history in response to product quality assurance requests. For example, in the component mounting system for manufacturing a mounting board, in order to prevent erroneous mounting in which a wrong component is mistakenly mounted, it has been proposed to recognize a component to be mounted before component mounting to determine whether or not the component is a correct component (for example, Japanese Patent Unexamined Publication No. 2013-115337). In the related art illustrated in Japanese Patent Unexamined Publication No. 2013-115337, characters and figures printed on a surface of a component are captured and recognized in a component mounter and it is determined whether or not the component is correct based on a recognition result. Therefore, there is an advantage that it is possible to determine whether the component is correct or not without requiring identification information such as a bar code for identifying a tray or the like in which the component is stored.

SUMMARY

However, in the related art including Japanese Patent Unexamined Publication No. 2013-115337, although it is possible to determine whether or not the component is correct by recognizing the component, no consideration has been given to a measure for reflecting a component recognition result on the production history data. That is, in the related art, as a measure for generating the production history data to secure the traceability, it is necessary for an operator to read the bar code attached as the identification information on a supply reel or a tray for supplying the component by a reading operation using a bar code reader and send the bar code to a host system. Since the reading operation is a cumbersome task which is frequently required every time the component is exchanged, a measure capable of generating the production history data without such work has been desired.

Therefore, an object of the disclosure is to provide a component mounting system and a trace data acquisition method capable of acquiring production history data without manually reading identification information such as a bar code.

According to the disclosure, there is provided a component mounting system including: a component mounter; and a server, in which the component mounter includes a component information recognizer configured to recognize component information printed on a surface of a component by imaging a character of the component information, and a data output unit configured to output the component information together with board information to the server, the component information being recognized by the component information recognizer, the board information being information of a board on which the component is installed.

According to the disclosure, there is provided a trace data acquisition method for acquiring production history data in a component mounting system including a component mounter and a server, the method including: a storage step of storing character type information defining a character type of each digit of regular component information; a component information recognizing step of recognizing the component information applied to a surface of a component by imaging a character of the component information and performing a recognition process of an image of the character of each digit of the recognized component information based on the character type information stored in the storage unit; and a data outputting step of outputting the component information together with board information to the server, the component information being recognized in the component information recognizing step, the board information being information of a board on which the component is installed.

According to the disclosure, it is possible to acquire the production history data without manually reading identification information such as a bar code.

BRIEF DESCRIPTION OF THE DRAWINGS

FIG. 11A is a view for explaining a traceability function by trace data generated by the component mounter of an embodiment of the disclosure;

FIG. 11B is a view for explaining the traceability function by the trace data generated by the component mounter of an embodiment of the disclosure; and FIG. 11C is a view for explaining the traceability function by the trace data generated by the component mounter of an embodiment of the disclosure.

DETAILED DESCRIPTION

Figure 1:
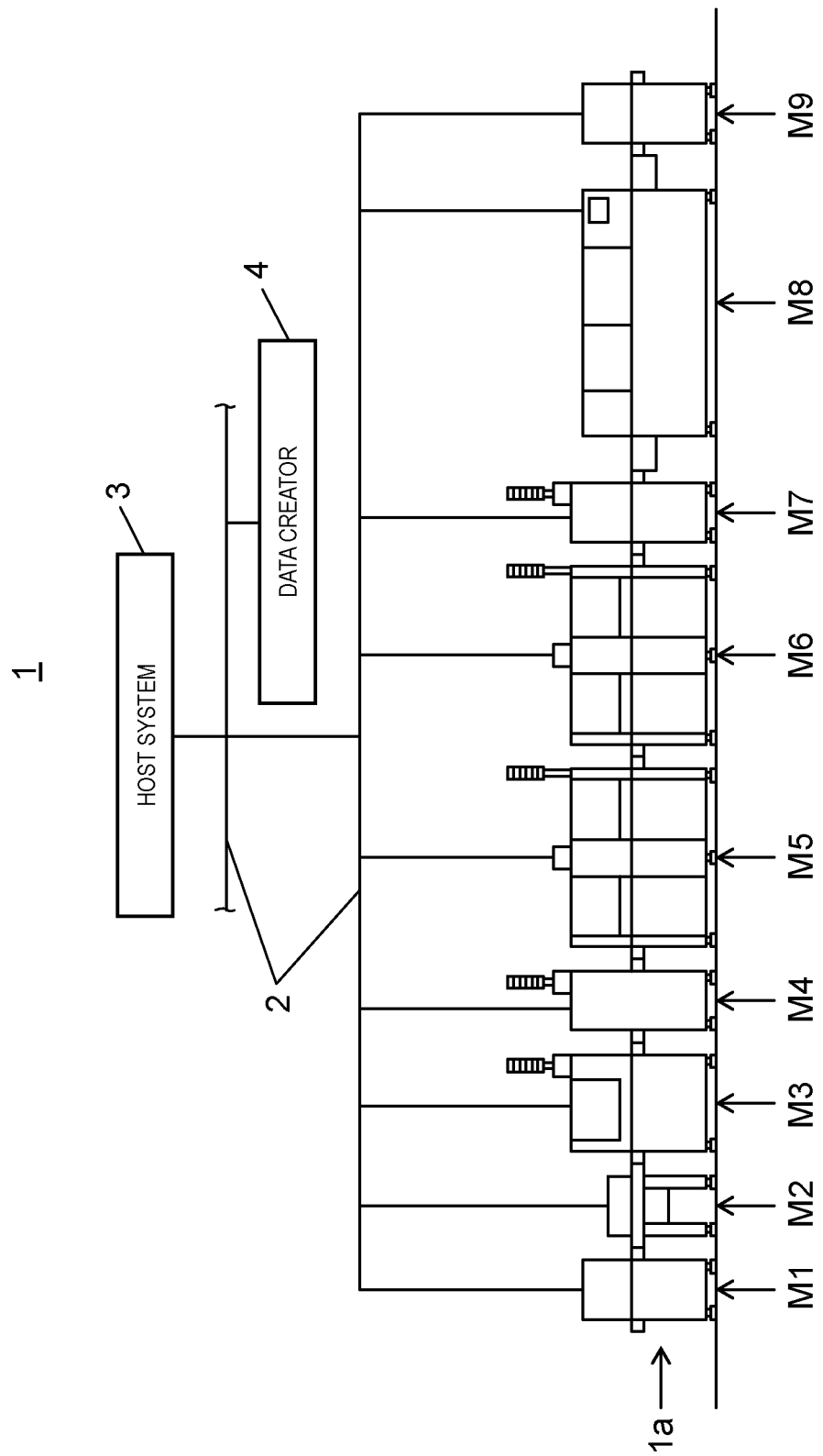
FIG. 1 is a view for explaining a configuration of a component mounting system in which component mounters of an embodiment of the disclosure are disposed.

Next, an embodiment of the disclosure will be described with reference to the drawings. First, a configuration of a configuration of component mounting system 1 will be described with reference to FIG. 1. Component mounting system 1 has a function of manufacturing a mounting board by installing an electronic component on a board. Component mounting system 1 includes component mounting line 1a to which a plurality of component mounters, which are described below, are connected, host system 3 which is connected to the plurality of component mounters via communication network 2, and data creator 4. Host system 3 has a function as a server which exchanges data with component mounting line 1a. Data creator 4 has a function of creating production data such as mounting data or recognition data used in each device of component mounting line 1a.

A configuration of component mounting line 1a will be described. Component mounting line 1a is configured by connecting, in series, board supply device M1, board delivery device M2, printer M3, printing inspection device M4, component mounters M5 and M6, installation state inspection device M7, reflow device M8, and board recovery device M9.

The board supplied by board supply device M1 is carried in printer M3 via board delivery device M2, where a solder printing operation for screen-printing a solder for component bonding on the board is performed. The board after solder printing is delivered to printing inspection device M4, where printing inspection work of the solder printed on the board is performed. The boards after the printing inspection are sequentially delivered to component mounters M5 and M6, where installing work for installing a component on the board after the solder printing is executed.

The board after the component installation is carried in installation state inspection device M7, where installation state inspection work of the component installed on the board is performed. After completion of the installation state inspection, the board is carried in reflow device M8, where solder for component bonding is melted and solidified by heating according to a predetermined heating profile. Therefore, the component is solder-bonded to the board, and the mounting board where the component is installed on the board is completed and is recovered in board recovery device M9.

Figure 2:
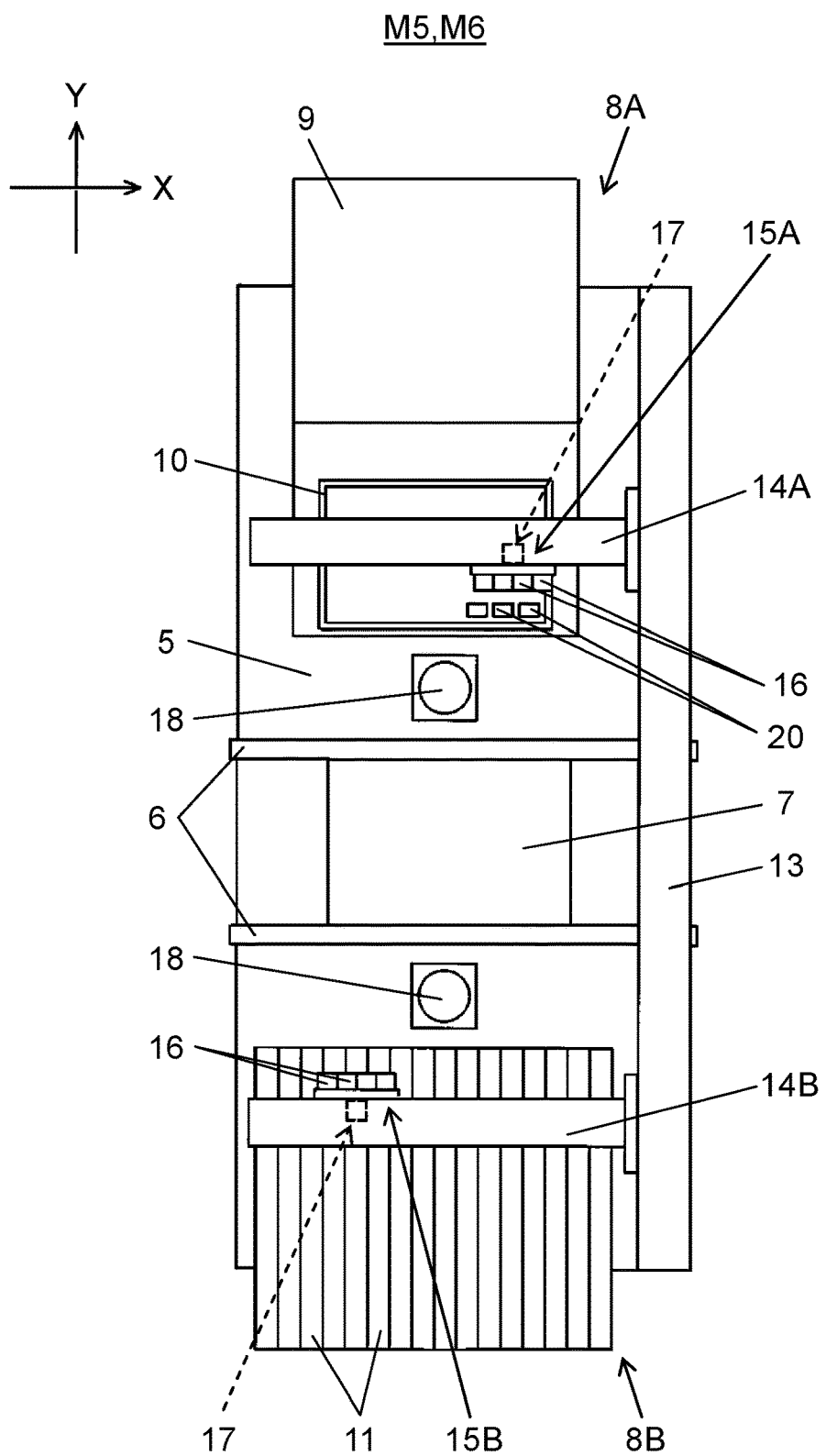
FIG. 2 is a plan view illustrating a configuration of the component mounter of an embodiment of the disclosure.

Configurations of component mounters M5 and M6 will be described with reference to FIG. 2. In FIG. 2, board transport mechanism 6 is disposed on an upper surface of base 5 in an X direction (board transport direction), and board transport mechanism 6 transports board 7, which is a target of component mounting, positions and holds board 7 at a working position by a component mounting mechanism which is described below. Component suppliers 8A and 8B for supplying components, which are mounted on board 7, are disposed on both sides of board transport mechanism 6.

Tray feeder 9 is disposed in component supplier 8A and a plurality of tape feeders 11 are disposed in component supplier 8B. Tray feeder 9 supplies tray 10, in which components 20 are stored in a lattice arrangement, to a component takeout position by the component mounting mechanism. Therefore, component 20 held in tray 10 is sent to a pickup position by an installing head of the component mounting mechanism. Tape feeder 11 pitch-feeds a carrier tape holding the component to supply the component to the component mounting mechanism.

Y-axis moving table 13 driven by a linear motor is disposed in a Y direction at one end portion in the X direction of base 5. Two X-axis moving tables 14A and 14B are coupled to Y-axis moving table 13 movably in the Y direction respectively corresponding to component suppliers 8A and 8B. Installing heads 15A and 15B are installed in X-axis moving tables 14A and 14B movably in the X direction by a linear driving mechanism. Each of installing heads 15A and 15B is a multiple type head including a plurality of unit transfer heads 16 and suction nozzle 16a (see FIG. 3A) is replaceably installed on a lower end portion of each of unit transfer heads 16.

Y-axis moving table 13 and X-axis moving table 14A are driven, so that installing head 15A horizontally moves between component supplier 8A and board 7 held by board transport mechanism 6. Therefore, component 20 stored in tray 10 is sucked and held by suction nozzle 16a, is picked up, and is installed in board 7. Y-axis moving table 13 and X-axis moving table 14B are driven, so that installing head 15B horizontally moves between component supplier 8B and board 7. Therefore, the component is sucked and held by suction nozzle 16a from the carrier tape which is pitch-sent by tape feeder 11, is taken out, and is installed in board 7. Therefore, Y-axis moving table 13, X-axis moving tables 14A and 14B, and installing heads 15A and 15B configure component mounting mechanism 12 (see FIG. 4) for mounting board 7 by sucking and holding the component by suction nozzle 16a of unit transfer head 16.

Installing heads 15A and 15B are provided with board recognition cameras 17 which are positioned on lower surface sides of X-axis moving tables 14A and 14B, and move integrally with installing heads 15A and 15B. Board recognition cameras 17 move above board 7 together with installing heads 15A and 15B, where position recognition of board 7 is performed by imaging board 7 by board recognition cameras 17. Recognition of a character of the component number and a character of the lot number which are described later is performed by imaging component 20 by board recognition cameras 17 in component suppliers 8A and 8B.

Component recognition cameras 18 are disposed between component suppliers 8A and 8B, and board transport mechanism 6. Installing heads 15A and 15B holding the components move above component recognition cameras 18, so that component recognition cameras 18 image the components. The imaged result is recognition-processed, so that recognition and position recognition of the components are performed in a state of being held by installing heads 15A and 15B.

A component installing operation and a component recognition operation which is executed during the component installing operation in component mounters M5 and M6 will be described with reference to FIGS. 3A, 3B, and 3C. In the embodiment, when the components are taken out from component suppliers 8A and 8B, the lot number, which is the component information for identifying the component number printed on the component and the components individually, is recognized.

Erroneous mounting for mounting different components is prevented by comparing the recognized component number with a regular component number, and the recognized lot number is transferred to host system 3 as trace data indicating a production history. Although the component installing operation of component supplier 8A as a target is described in here as an example, the same is applied to component supplier 8B as a target.

Figure 3A:
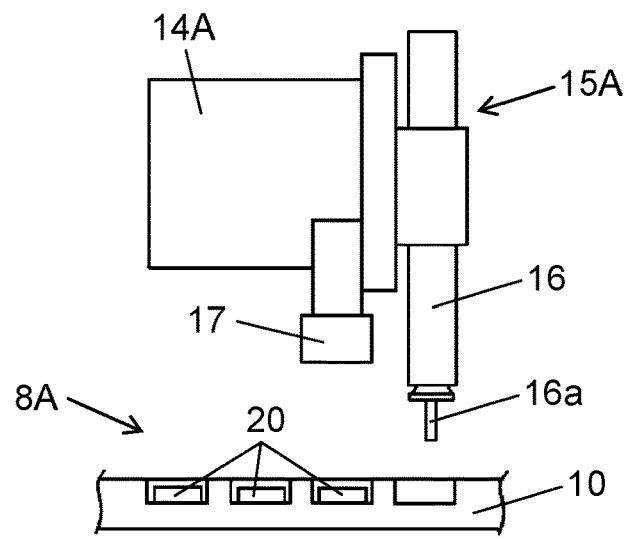
FIG. 3A is a view for explaining a function of the component mounter of an embodiment of the disclosure.

When the component is taken out, component mounting mechanism 12 is driven and as illustrated in FIG. 3A, installing head 15A is moved to component supplier 8A. Before component 20 of a target to be taken out stored in tray 10 is sucked by suction nozzle 16a of unit transfer head 16, board recognition camera 17 is positioned above component 20 and images component 20.

Figure 3B:
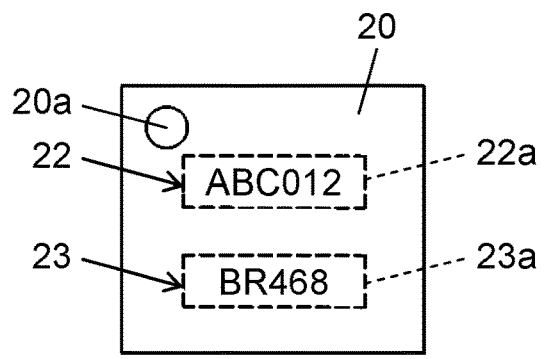
FIG. 3B is a view for explaining a function of the component mounter of an embodiment of the disclosure.
Figure 3C:
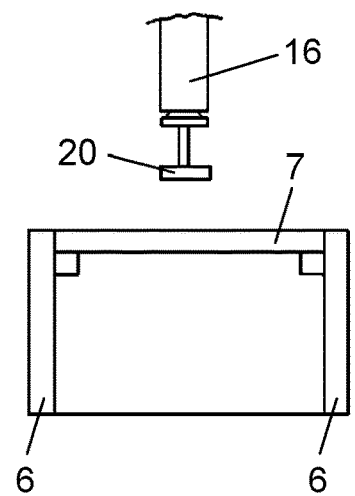
FIG. 3C is a view for explaining a function of the component mounter of an embodiment of the disclosure.

As illustrated in FIG. 3B, polar mark 20a is provided, and component number character string 22 and lot number character string 23 are printed on an upper surface of component 20. Component number character string 22 and lot number character string 23 are printed in region 22a and region 23a set in advance on the upper surface of component 20. In an image obtained by imaging component 20, it is possible to obtain character images of component number character string 22 and lot number character string 23 by capturing image information in region 22a and region 23a.

Component 20 of which component number character string 22 is confirmed to match with the regular component number in the character recognition is the target of the component installation. That is, unit transfer head 16 is moved above component 20 and component 20 is sucked and held by suction nozzle 16a. Unit transfer head 16 holding component 20 is moved above component recognition camera 18 and positional shifting of component 20 in installing head 15A is detected. Thereafter, as illustrated in FIG. 3C, unit transfer head 16 is moved above board 7 and held component 20 is installed in a mounting point of board 7.

Figure 4:
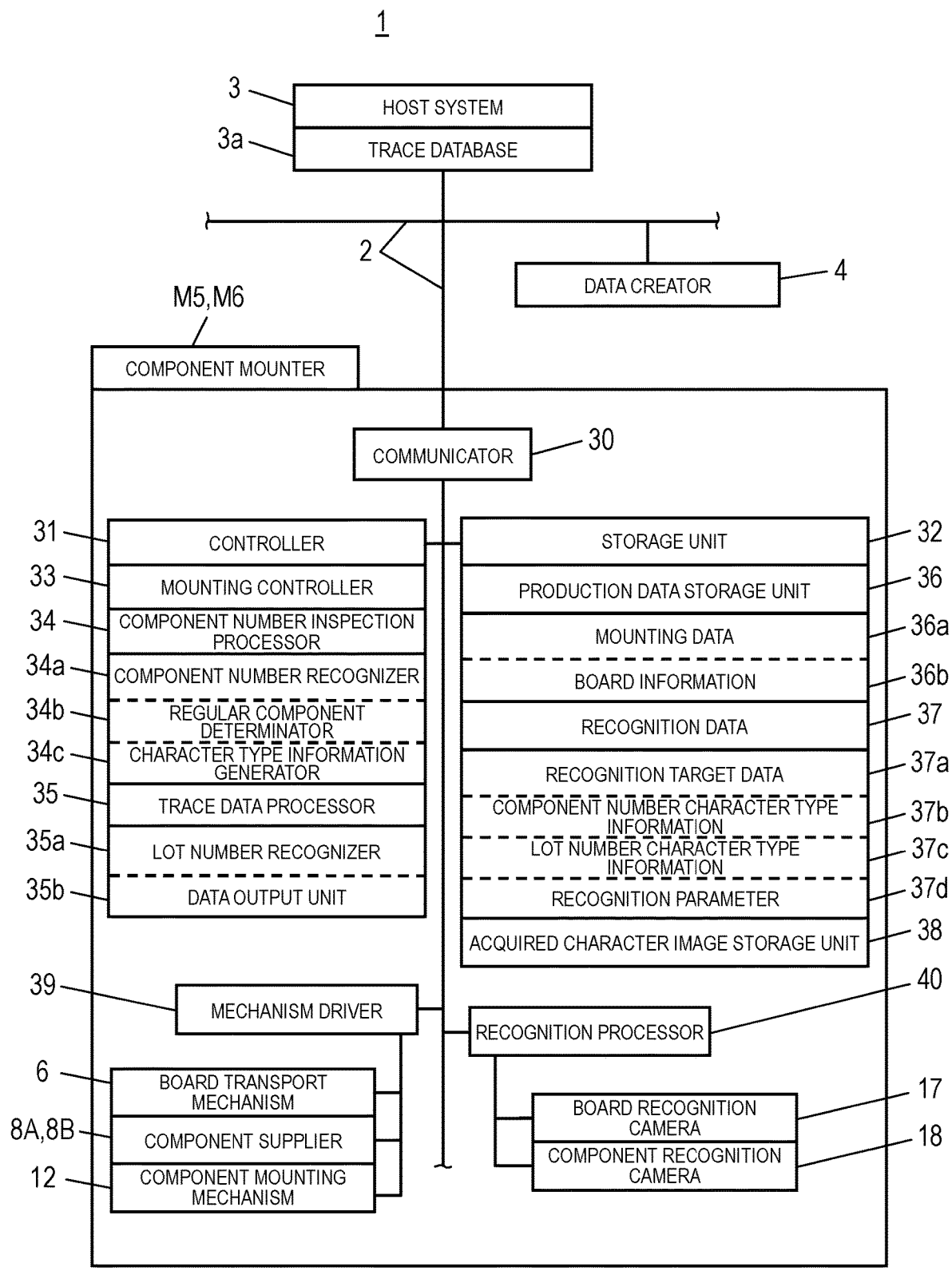
FIG. 4 is a block diagram illustrating a configuration of a control system of a component mounting system of an embodiment of the disclosure.

Next, a configuration of a control system of component mounting system 1 will be described with reference to FIG. 4. Here, only components related to component mounters M5 and M6 among the facilities constituting component mounting system 1 will be described. In FIG. 4, communicator 30, which is a communication interface of component mounters M5 and M6, is connected to host system 3 and data creator 4 via communication network 2.

Host system 3 is a server including trace database 3a. Host system 3 stores production history information transferred from component mounters M5 and M6, that is, board information for specifying each board and data such as date of manufacture, the component number and the lot number of the component installed in each board as the trace data. Data creator 4 creates data used for the production of the mounting board in component mounters M5 and M6, that is, the production data such as the mounting data and the recognition data. The created data is downloaded to component mounters M5 and M6 via communication network 2.

Configurations of component mounters M5 and M6 will be described. Component mounters M5 and M6 include controller 31, storage unit 32, mechanism driver 39, and recognition processor 40. Controller 31 is a CPU including a calculation processing function and controls various processes and operations for the production of the mounting board based on various data stored in storage unit 32. Mechanism driver 39 is a driver and drives board transport mechanism 6, component suppliers 8A and 8B, and component mounting mechanism 12. Recognition processor 40 performs a recognition process of the images captured by board recognition camera 17 and component recognition camera 18. Here, recognition processor 40 executes the recognition process for recognizing the position of component 20 or board 7, and the recognition process of component number character string 22 or lot number character string 23 printed on component 20 is performed by a dedicated recognition processing function included in controller 31.

Data stored in storage unit 32 will be described. Storage unit 32 includes production data storage unit 36 and acquired character image storage unit 38. Data generated by data creator 4 is transferred to production data storage unit 36. Production data storage unit 36 stores mounting data 36a, board information 36b, and recognition data 37. Board information 36b is information including a kind, a size, board ID, or the like of the board which is the target of the production. Mounting data 36a is data indicating a component name, component number character string 22, and lot number character string 23 of the component to be mounted on each board, installation position data in the board, a supply form of the component in component suppliers 8A and 8B, or the like. In the embodiment, recognition data 37 described below is defined as a part of the production data stored in production data storage unit 36.

Recognition data 37 is data for used in recognition of the component number for preventing erroneous mounting and recognition of the lot number for acquiring the trace data. Recognition data 37 includes recognition target data 37a, component number character type information 37b, lot number character type information 37c, and recognition parameter 37d. Recognition target data 37a specifies whether or not component number character string 22 printed on each board is an inspection target (component inspection ON), and whether or not lot number character string 23 is a recognition target (character recognition ON). In a case where it is to be the inspection or the recognition target, region designation data for specifying region 22a and region 23a (see FIG. 3B) in which component number character string 22 and lot number character string 23 are printed is provided.

Component number character type information 37b is information that defines a character type for each digit position constituting component number character string 22. As the character type, three types of upper case letters, alphabet letters, and numbers are used. That is, storage unit 32 stores the character type information that defines the kind of the character type of each digit of the regular component number. In the embodiment, the character type information is automatically generated based on regular component number character string 22 input by a user by a processing function of character type information generator 34c which is described later.

Lot number character type information 37c is information that defines the character type for each digit position of each character constituting lot number character string 23. Similarly, three types of upper case letters, alphabet letters, and numbers are used. If necessary, symbols such as slashes and hyphens may be used in addition to the three types. That is, the character type used here is a form including at least numbers, and upper case letters and alphabet letters which are alphabets.

Recognition parameter 37d is a parameter that defines a recognition condition for individually recognizing each character constituting component number character string 22 and lot number character string 23. The recognition parameter includes character orientation, character lightness, size, or the like. Acquired character image storage unit 38 stores a plurality of character images captured for the character recognition of component number character string 22 and lot number character string 23. In the recognition process by component number recognizer 34a and lot number recognizer 35a which are described later, the character image stored in acquired character image storage unit 38 is read to become a target of the recognition process.

Controller 31 includes mounting controller 33, component number inspection processor 34, and trace data processor 35. Mounting controller 33 controls mechanism driver 39 based on mounting data 36a and board information 36b, so that board transport mechanism 6, component supplier 8A, and component mounting mechanism 12 are driven, and thereby the component installing operation is executed.

Component number inspection processor 34 performs component number inspection, that is, whether or not the component number of the component to be an inspection target matches with the regular component number based on recognition target data 37a, component number character type information 37b, and recognition parameter 37d. Component number inspection processor 34 includes component number recognizer 34a, regular component number determinator 34b, and character type information generator 34c. Component number recognizer 34a has a function of recognizing the component number by imaging the character of the component number applied to the surface of the component by board recognition camera 17, and performing the recognition process of the captured character image of each digit based on component number character type information 37b stored in storage unit 32.

Regular component number determinator 34b determines whether or not component number character string 22 recognized by component number recognizer 34a matches with the regular component number. In a case where it is determined that component number character string 22 matches with the regular component number by regular component number determinator 34b, installing heads 15A and 15B are adapted to install component 20 on board 7.

Character type information generator 34c automatically performs a process of creating the character type information based on the regular component number input by the user. That is, the character type is determined from an identification result of the character of each digit of the input component number and the character type information for defining the character type of each digit is created.

Trace data processor 35 performs a trace data process based on recognition target data 37a, lot number character type information 37c, and recognition parameter 37d, that is, a process of recognizing lot number character string 23 of the component to be the target of the trace data and outputting a recognition result. Trace data processor 35 includes lot number recognizer 35a and data output unit 35b.

Lot number recognizer 35a is a component information recognizer and recognizes lot number character string 23 by imaging the character of lot number character string 23, which is the component information printed on the surface of component 20, by board recognition camera 17. In the recognition, lot number recognizer 35a recognizes lot number character string 23 based on lot number character type information 37c stored in storage unit 32. Lot number character type information 37c is input by the user via data creator 4.

Data output unit 35b outputs lot number character string 23, which is recognized by lot number recognizer 35a, to host system 3 that is a server together with board information 36b of board 7 on which component 20 is installed. In the data output, data output unit 35b outputs information of the date of manufacture on which board 7 is manufactured to host system 3 together with lot number character string 23, which is the component information, and board information 36b. Therefore, it is possible to create the trace data that specifies the manufacturing history by the date of manufacture.

Figure 5:
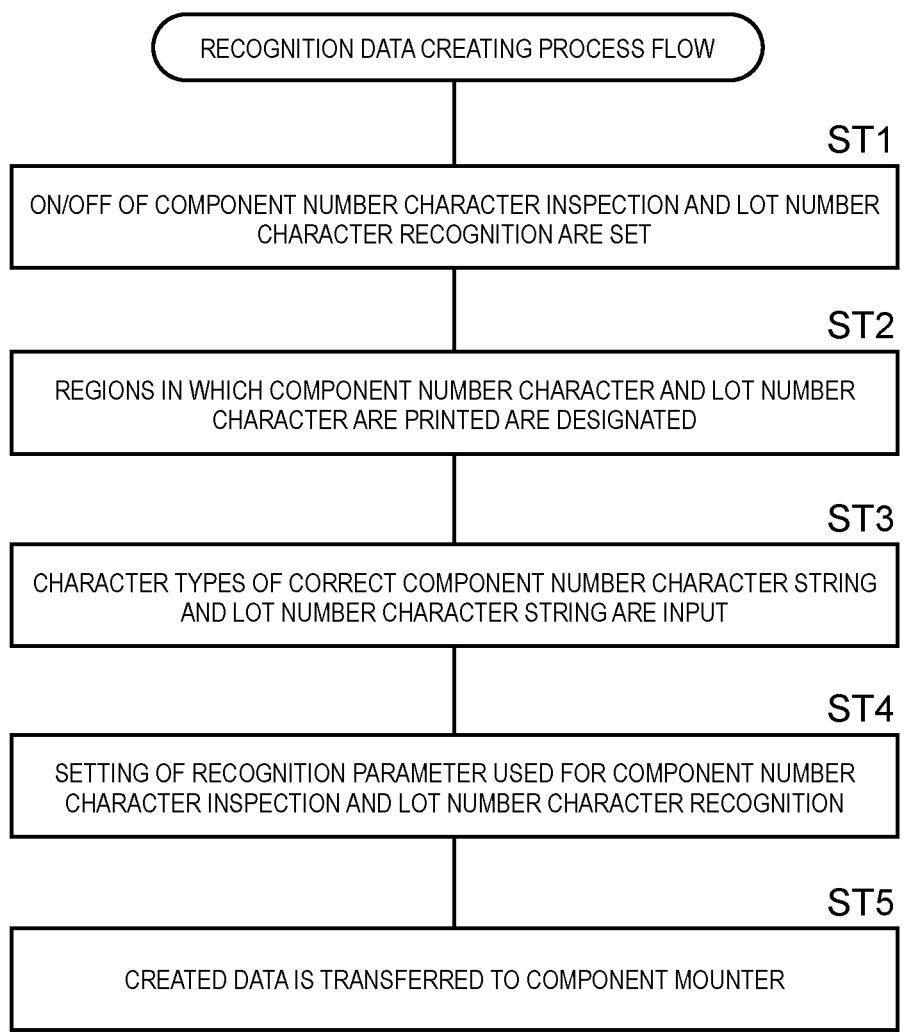
FIG. 5 is a flowchart illustrating a recognition data creating process used in the component mounter of an embodiment of the disclosure.

Next, the recognition data creating process for creating the recognition data stored in recognition data 37 by data creator 4 will be described with reference to a flow of FIG. 5. First, ON/OFF of the component number character inspection and the lot number character recognition is set (ST1). Therefore, among components to be the mounting target mounted on board 7, a component requiring inspection for preventing erroneous mounting and a component requiring recording the production history as the trace data are specified.

Figures 9A, 9B, 9C, 9D, 9E:
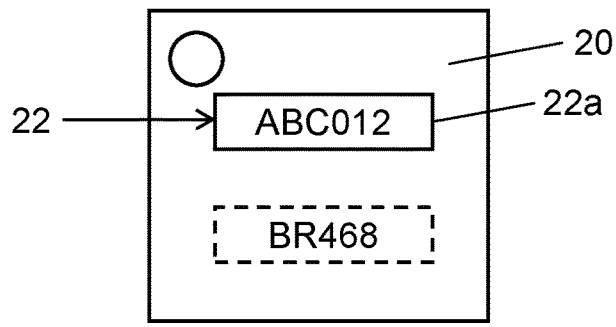
FIG. 9A is a view for explaining a recognition process which is executed in the component number character inspection in the component mounter of an embodiment of the disclosure.
FIG. 9B is a view for explaining the recognition process which is executed in the component number character inspection in the component mounter of an embodiment of the disclosure.
FIG. 9C is a view for explaining the recognition process which is executed in the component number character inspection in the component mounter of an embodiment of the disclosure.
FIG. 9D is a view for explaining the recognition process which is executed in the component number character inspection in the component mounter of an embodiment of the disclosure.
FIG. 9E is a view for explaining the recognition process which is executed in the component number character inspection in the component mounter of an embodiment of the disclosure.

Next, regions in which the component number character and the lot number character are printed are designated (ST2). That is, the positions of region 22a and region 23a illustrated in FIG. 3B are input, and regions to be a target of the character recognition are specified in an acquired character image. Next, a correct character type of the component number character string and the lot number character string is input (ST3). For the component number character, as illustrated in FIG. 9A, component number character string 22 corresponding to individual component number characters for each number of digit number 22b is input. The input of the character type of the component number character string and the lot number character string is performed by the user.

Figure 10A:
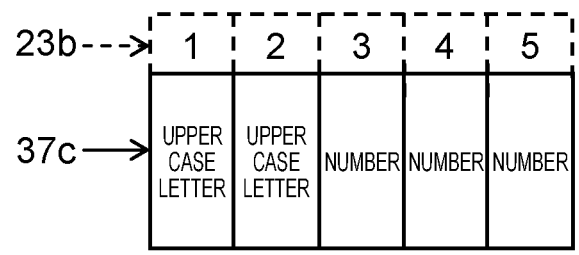
FIG. 10A is a view for explaining a lot number character recognition process in the component mounter of an embodiment of the disclosure.

For the character type of the lot number character string, as illustrated in FIG. 10A, lot number character type information 37c corresponding to a division of upper case letters, alphabet letters, and numbers for each number of digit number 23b is input. In the character type of the lot number character string, two kinds of the character types (for example, upper case letters and numbers) may correspond to the same number of digit number 23b. This is because, in a case where the date of manufacture is included in the lot number character string, there are cases where the upper case letters are used corresponding to the numbers instead of numbers specifying months by two digits such as November.

Next, setting of the recognition parameter used for the component number character inspection and the lot number character recognition is performed (ST4). Here, items, which become identification conditions at the time of image recognition, such as the orientation of the character, the size of the character, the brightness and color of the character, the color tone or the like in the printed state, are input. Data which is created as described above is transferred to component mounters M5 and M6 and stored in recognition data 37 (ST5).

Figure 6:
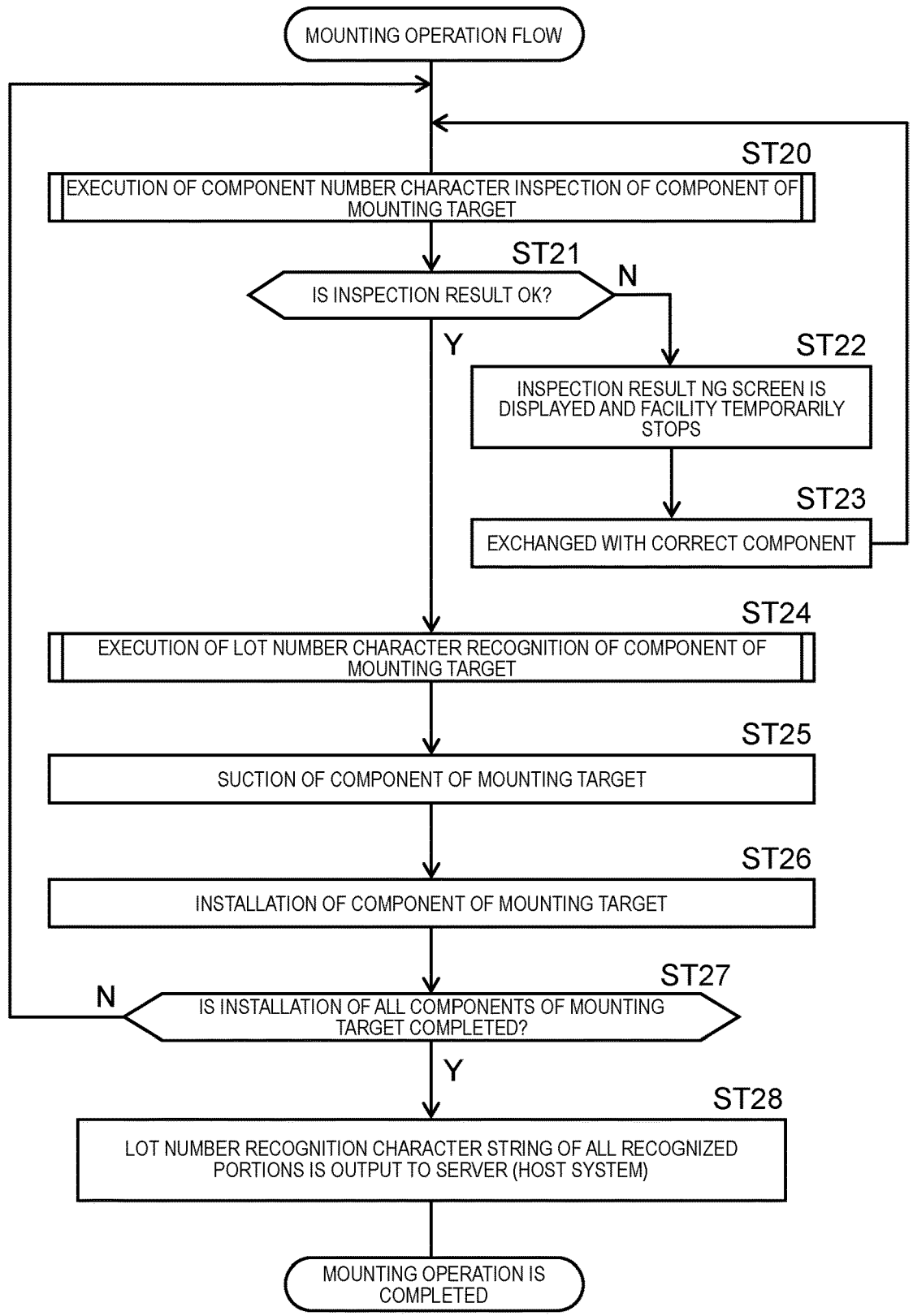
FIG. 6 is a flowchart illustrating a mounting operation by the component mounter of an embodiment of the disclosure.

Next, the mounting operation executed in component mounting system 1 illustrated in the embodiment will be described with reference to a flow of FIG. 6. When the mounting operation is started, first, the component number character inspection of the component of the mounting target is executed (ST20). That is, whether or not the component of the mounting target is a correct component having the regular component number is inspected. Next, it is determined whether or not an inspection result is OK (ST21). Here, if the inspection result is NG, an inspection result NG screen is displayed on display units included in component mounters M5 and M6, and the facility temporarily stops (ST22). After the component in which the inspection result is NG is exchanged with a correct component (ST23), the procedure returns to (ST20) to execute the inspection again.

In (ST21), if the inspection result is OK, the lot number character recognition of the component of the mounting target is executed (ST24). Thereafter, suction of the component of the mounting target is performed (ST25). That is, component 20 is sucked and held by suction nozzle 16a of unit transfer head 16. Next, installation of the component of the mounting target is performed (ST26). That is, installing heads 15A and 15B are moved to board 7 and, as illustrated in FIG. 3C, component 20 held by unit transfer head 16 is installed in the mounting point of board 7 (ST26).

Next, it is determined whether or not installation of all the components of the mounting target is completed (ST27). Here, if it is NO, processes after (ST20) are repeatedly executed. In (ST27), if it is confirmed that the installation of all the components of the mounting target is completed, the lot number character strings of all recognized components are data-output to the server (host system 3) by data output unit 35b as the trace data (production history data). The trace data transferred to host system 3 is stored in trace database 3a (FIG. 4). Therefore, the mounting operation is completed.

Figure 7:
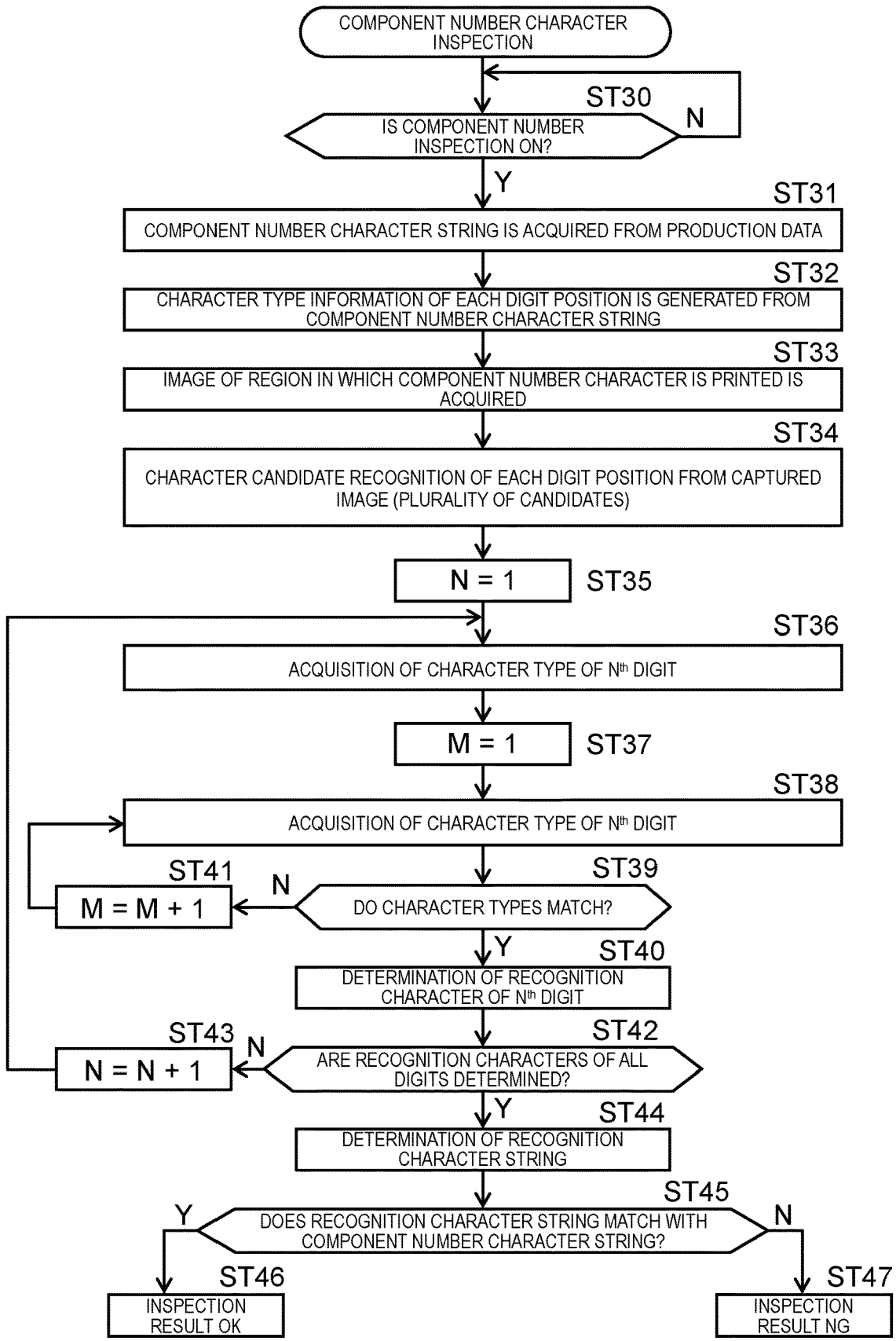
FIG. 7 is a flowchart of component number character inspection in the component mounter of an embodiment of the disclosure.

Next, details of the component number character inspection illustrated in (ST20) of FIG. 6 will be described with reference to a flow of FIG. 7 and FIGS. 9A to 9E. In FIG. 7, first, it is determined whether or not the component to be the target is designated as component number inspection ON by referring to data stored in recognition target data 37a (ST30). Here, for the component corresponding to the component number inspection ON, the following process is executed. For the component that is not the component number inspection ON, the following process is skipped.

First, the component number character string of the relevant component is acquired from the production data stored in production data storage unit 36 (ST31). Therefore, as illustrated in FIG. 9A, component number character string 22 corresponding to the character constituting the component number of each digit of digit number 22b is acquired. Next, the character type information of each digit position is generated from the acquired component number character string (ST32). Therefore, as illustrated in FIG. 9B, component number character type information 37b in which the character type of each digit position is made to correspond to each digit of digit number 22b is generated. The process is executed by the processing function of character type information generator 34c included in controller 31. Generated component number character type information 37b is stored in recognition data 37. That is, here, the character type information for defining the kind of the character type for each digit of the regular component number is stored (storage step).

Next, an image of a region in which the component number character is printed is acquired (ST33). That is, as illustrated in FIG. 9C, a captured image of region 22a in which component number character string 22 is printed on the upper surface of component 20 is acquired from acquired character image storage unit 38. Here, since the characters of each digit position are confirmed by a plurality of recognition processes, a plurality of candidate images to be used for each recognition process are acquired.

FIG. 9D illustrates the plurality (here, two) of candidate images ("candidate 1" 22c1 and "candidate 2" 22c2) which are acquired as described above. In "candidate 1" 22c1, each character of A8C012 is acquired corresponding to digit positions 1 to 6. In "candidate 2" 22c2, each character of RBE0I6 is acquired corresponding to digit positions 1 to 6.

The character candidate of each digit position is recognized from the acquired captured image (ST34). Here, the recognition process for determining the character of each digit position is sequentially executed for each digit. That is, the character of the component number applied to the surface of component 20 is captured and the recognition process of the captured character image of each digit is performed based on component number character type information 37b stored in storage unit 32, so that component number character string 22 is recognized (component number recognition step).

In the process, the recognition process of a plurality of recognition images with characters of a plurality of digits as the recognition target is executed as a recognition character candidate. Therefore, index N indicating a processing order for sequentially targeting each digit position, or index M indicating a processing order for sequentially targeting each recognition character candidate is set.

First, initially, N=1 is set (ST35) and a character type of a first digit is acquired (ST36). Here, the character type (upper case letters) of the first digit is acquired from component number character type information 37b illustrated in FIG. 9B. Next, M=1 is set (ST37) and a first recognition character candidate of the first digit is acquired (ST38). Here, "A" of the upper case letter of the first digit of "candidate 1" 22c1 is acquired. It is determined whether or not the character types match (ST39). That is, the acquired character type of the recognition character candidate is compared with the character type indicated in the character type information.

Here, if the character types match, the recognition character of the first digit is determined (ST40). In the example illustrated in here, since the character type (upper case letters) of the acquired recognition character candidate matches with the character type (upper case letters) indicated in the character type information, the recognition character of the first digit is determined as "A" of the upper case letter (see "A" of the upper case letter marked with a circle in "candidate 1" 22c1 illustrated in FIG. 9D).

In (ST39), in a case where the character types do not match, M is incremented to be set to M=M+1 (ST41), and a second recognition character candidate is acquired (ST38). For example, in the recognition character candidate of a second digit of "candidate 1" 22c1, "8" of a number different from the character type (upper case letter) indicated in the character type information is acquired and it is determined as no match in the determination of the match of the character types of (ST39).

In this case, "B" of an upper case letter of the second digit of "candidate 2" 22c2 is acquired and the character type (upper case letter) of the acquired recognition character candidate is compared with the character type (upper case letter) indicated in the character type information in the determination of the match of the character types of (ST39). Here, since the character types match, the recognition character of the second digit is determined as "B" of the upper case letter (see "B" of the upper case letter marked with a circle in "candidate 2" 22c2 illustrated in FIG. 9D).

In the process described above, component number recognizer 34a sequentially extracts a plurality of candidates from the character image of each digit, which is captured in the recognition process and stored in acquired character image storage unit 38 according to a priority order assigned in advance. In a case where the character type of the recognition character of the first candidate ("candidate 1" 22c1) which is the highest in the priority order matches with the character type of the corresponding digit stored in storage unit 32 as component number character type information 37b, the recognition character of the first candidate is employed as the character of the component number.

In a case where the character type of the recognition character of the first candidate ("candidate 1" 22c1) which is the highest in the priority order does not match with the character type of the corresponding digit stored in storage unit 32 as component number character type information 37b, and the second candidate ("candidate 2" 22c2) which is the highest next the first candidate in the priority order matches with the character type of the corresponding digit stored in storage unit 32 as component number character type information 37b, component number recognizer 34a employs the recognition character of the second candidate as the character of the component number.

In this manner, similar recognition process is repeatedly executed on the character candidate of each digit position to be the target. Here, a case where the recognition character candidates of the first digit, a third digit, a fifth digit, and a sixth digit among the recognition character candidates of "candidate 1" 22c1 illustrated in FIG. 9D match with the character types of the corresponding digits stored as component number character type information 37b is illustrated. That is, the character type of each of the characters of the first digit (upper case letter A), the third digit (upper case letter C), the fifth digit (number 1), and the sixth digit (number 2) which are marked respectively with circles in "candidate 1" 22c1 matches with the character type indicated by component number character type information 37b. Therefore, the recognition characters are employed as the characters of component number character string 22.

Meanwhile, the character type of the recognition character candidate (upper case letter O) of a fourth digit among the recognition character candidates of "candidate 1" 22c1 is different from the character type (number) of the corresponding component number stored as component number character type information 37b. Therefore, the character type of the recognition character candidate (number 0) of the corresponding fourth digit in the second candidate ("candidate 2" 22c2) having the next highest priority order becomes the target of the comparison. Here, since the character type is a number in any case, the recognition character recognizing the recognition character candidate (number 0) is employed as the character of component number character string 22.

That is, in the recognition process described above, the recognition character of an $N^{th}$ digit is determined (ST40) by repeatedly executing (ST38) and (ST39). It is determined whether or not the recognition characters of all digits are determined (ST42) and the determination of the recognition characters of all digits is confirmed, so that as illustrated in FIG. 9E, recognition character string 22R configured of the recognition characters is determined (ST44). In (ST42), in a case where the recognition characters of all digits are not determined, N is incremented to be set to N=N+1 (ST43), and the procedure returns to (ST36).

Recognition character string 22R which is determined as described above becomes a target of the determination whether or not matching with the component number character string stored in storage unit 32 (ST45). That is, it is determined whether or not the component number recognized in the component number recognition step matches with the regular component number (regular component determination step). Here, if the match is confirmed, the inspection result OK is determined (ST46) and the procedure proceeds to (ST24) of FIG. 6.

After the process (ST24) to be described below, the process goes to suction (ST25) of the component of the mounting target and installation (ST26) of the component of the mounting target. That is, in a case where it is determined that the component number matches with the regular component number in the regular component determination step, component 20 is installed on board 7 (installation step). In a case where it is determined that the component number does not match with the regular component number, the inspection result NG is determined (ST47) and the procedure proceeds to (ST22) of FIG. 6.

Figure 8:
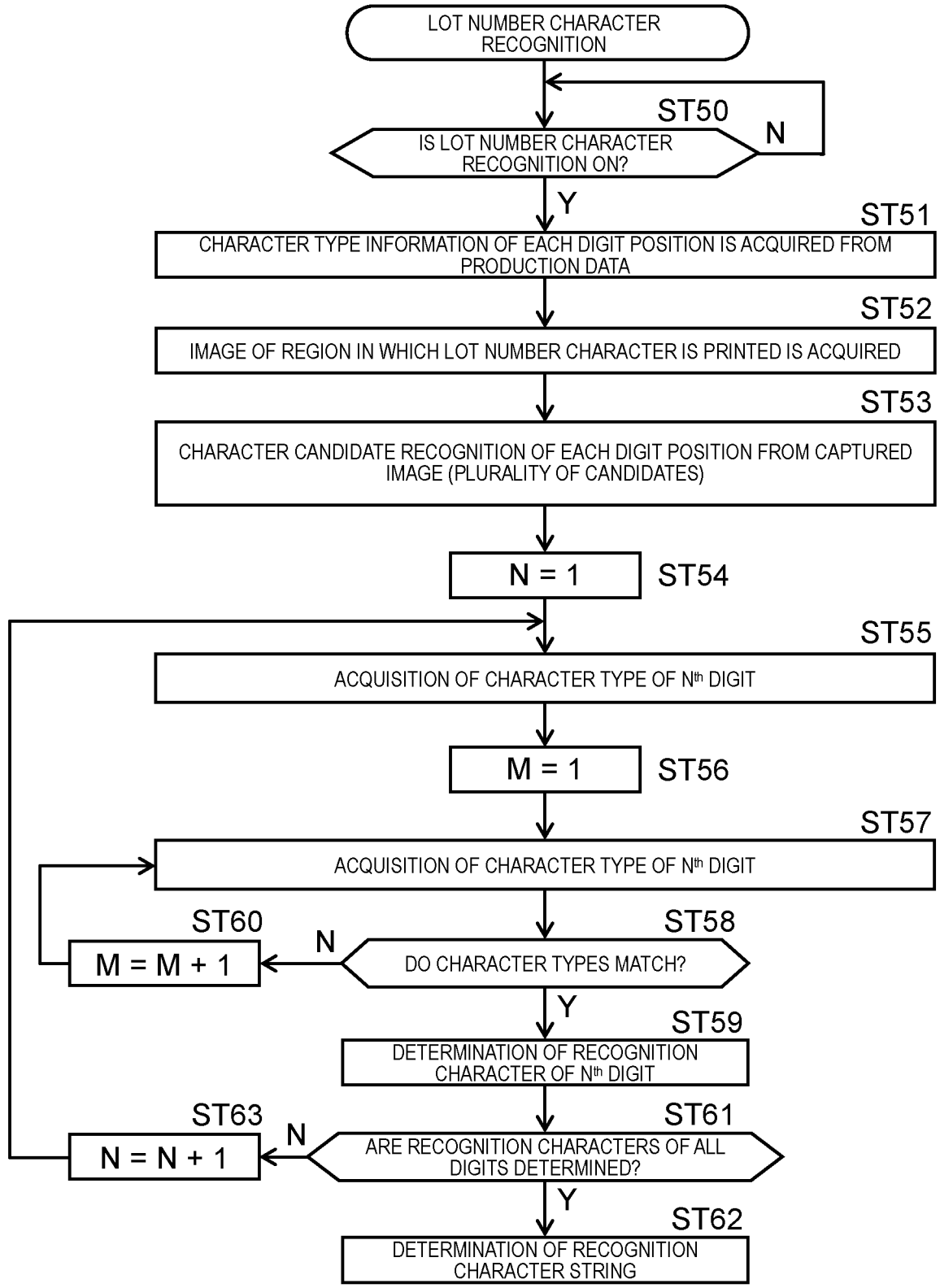
FIG. 8 is a flowchart of lot number character recognition in the component mounter of an embodiment of the disclosure.

Next, details of the lot number character recognition illustrated in (ST24) of FIG. 6 and a trace data acquisition method for acquiring the production history data in component mounting system 1 including component mounters M5 and M6 will be described with reference to a flow of FIG. 8 and FIGS. 10A to 10D. In FIG. 8, first, it is determined whether or not the component to be the target is designated as the lot number character recognition ON by referring data stored in recognition target data 37a (ST50). Here, for the component corresponding to the lot number character recognition ON, the following process is executed. For the component that is not the lot number character recognition ON, the following process is skipped.

First, the character type information of each digit position of the lot number character of the component is acquired from the production data stored in production data storage unit 36 (ST51). That is, as illustrated in FIG. 10A, lot number character type information 37c corresponding to the character type of the character constituting the lot number at each digit position of digit number 23b is acquired. Lot number character type information 37c is created by using data creator 4 by input of the user in advance, and is stored in storage unit 32 in advance. That is, here, the character type information defining the kind of the character type of each digit of the lot number that is the regular component information is stored (storage step).

Figure 10B:
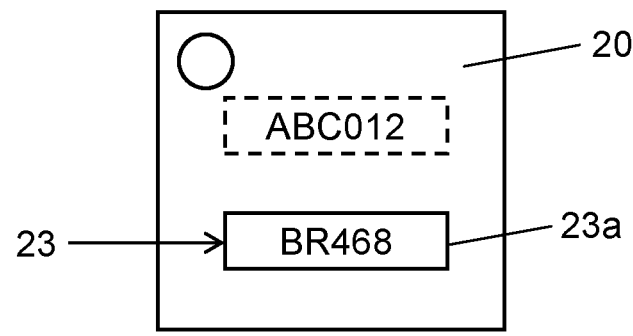
FIG. 10B is a view for explaining the lot number character recognition process in the component mounter of an embodiment of the disclosure.

Next, an image of a region in which the lot number character is printed is acquired (ST52). That is, as illustrated in FIG. 10B, the captured image of region 23a in which lot number character string 23 is printed on the upper surface of component 20 is acquired from acquired character image storage unit 38. Here, since the characters of each digit position are determined by a plurality of recognition processes, images of the plurality of candidates to be used for each recognition process are acquired.

Figure 10C:
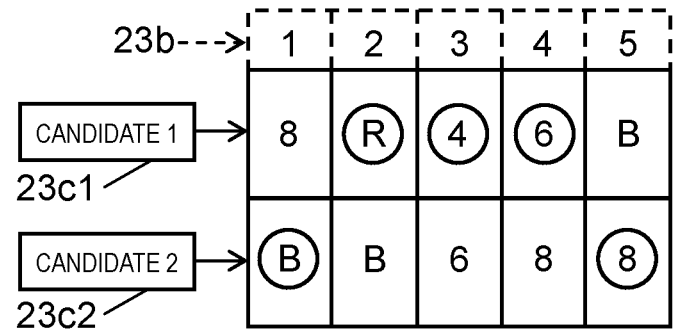
FIG. 10C is a view for explaining the lot number character recognition process in the component mounter of an embodiment of the disclosure.

FIG. 10C illustrates the plurality (here, two) of candidate images ("candidate 1" 23c1 and "candidate 2" 23c2) which are acquired as described above. In "candidate 1" 23c1, each character of 8R46B is acquired corresponding to digit positions 1 to 5.

In "candidate 2" 23c2, each character of BB688 is acquired corresponding to digit positions 1 to 5.

The character candidate of each digit position is recognized from the acquired captured image (ST53). Here, the recognition process for determining the character of each digit position is sequentially executed for each digit. That is, the character of the lot number applied to the surface of component 20 is captured and the recognition process of the captured character image of each digit is performed based on lot number character type information 37c stored in storage unit 32, so that lot number character string 23 is recognized (component information recognition step).

In the process, the recognition process of recognition images with characters of a plurality of digits as the recognition target is executed as a recognition character candidate. Therefore, index N indicating a processing order for sequentially targeting each digit position, or index M indicating a processing order for sequentially targeting each recognition character candidate is set.

First, initially, N=1 is set (ST54) and a character type of a first digit is acquired (ST55). Here, the character type (upper case letters) of the first digit is acquired from lot number character type information 37c illustrated in FIG. 10A. Next, M=1 is set (ST56) and a first recognition character candidate of the first digit is acquired (ST57). Here, a number "8" of the first digit of "candidate 1" 23c1 is acquired. It is determined whether or not the character types match (ST58). That is, the acquired character type of the recognition character candidate is compared with the character type indicated in the character type information.

In the example illustrated in here, since the character type (number) of the acquired recognition character candidate does not match with the character type (upper case letter) indicated in the character type information, M is incremented to be set to M=M+1 (ST60), and the next second recognition character candidate is acquired (ST57). That is, "B" of the upper case letter of the first digit of "candidate 2" 23c2 illustrated in FIG. 10C is acquired. In this case, the character type (upper case letter) of the acquired recognition character candidate is compared with the character type (upper case letter) indicated in the character type information in the determination of the match of the character types of (ST58). Here, since the character types match, the recognition character of the first digit is determined as "B" of the upper case letter (see "B" of the upper case letter marked with a circle in "candidate 2" 23c2 illustrated in FIG. 9C).

In the process described above, lot number recognizer 35a sequentially extracts a plurality of candidates from the character image of each digit, which is captured in the recognition process and stored in acquired character image storage unit 38 according to a priority order assigned in advance. In a case where the character type of the recognition character of the first candidate ("candidate 1" 23c1) which is the highest in the priority order matches with the character type of the corresponding digit stored in storage unit 32 as lot number character type information 37c, lot number recognizer 35a employs the recognition character of the first candidate as the character of the lot number.

In a case where the character type of the recognition character of the first candidate ("candidate 1" 23c1) which is the highest in the priority order does not match with the character type of the corresponding digit stored in storage unit 32 as lot number character type information 37c, and the second candidate ("candidate 2" 23c2) which is the highest next the first candidate in the priority order matches with the character type of the corresponding digit stored in storage unit 32 as lot number character type information 37c, the recognition character of the second candidate is employed as the character of the lot number.

In this manner, similar recognition process is repeatedly executed on the recognition character candidate of each digit position to be the target. Here, a case where the recognition character candidates of a second digit, a third digit, and a fourth digit among the recognition character candidates of "candidate 1" 23c1 illustrated in FIG. 10C match with the character type of the corresponding digits stored as lot number character type information 37c is illustrated. That is, the character type of each of the characters of the second digit (upper case letter R), the third digit (number 4), and the fourth digit (number 6) marked respectively with circles in "candidate 1" 23c1 matches with the character type indicated by lot number character type information 37c. Therefore, the recognition characters are employed as the characters of the recognition lot number.

Meanwhile, the character type of the recognition character candidate (upper case letter B) of a fifth digit among the recognition character candidates of "candidate 1" 23c1 is different from the character type (number) of the corresponding lot number stored as lot number character type information 37c.

Therefore, the character type of the recognition character candidate (number 8) of the corresponding fifth digit in the second candidate ("candidate 2" 23c2) having the next highest priority order becomes the target of the comparison. Here, since the character type is a number in any case, the recognition character recognizing the recognition character candidate (number 8) is employed as the character of the lot number.

Figure 10D:
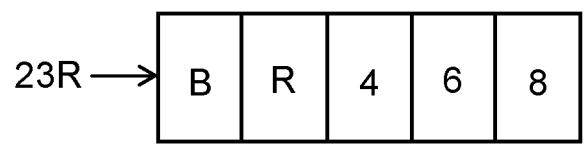
FIG. 10D is a view for explaining the lot number character recognition process in the component mounter of an embodiment of the disclosure.

That is, in the recognition process described above, the recognition character of an $N^{th}$ digit is determined (ST59) by repeatedly executing (ST57) and (ST58). It is determined whether or not the recognition characters of all digits are determined (ST61) and the determination of the recognition characters of all digits is confirmed, so that as illustrated in FIG. 10D, recognition character string 23R configured of the recognition characters is determined (ST62). In (ST61), in a case where the recognition characters of all digits are not determined, N is incremented to be set to N=N+1 (ST63), and the procedure returns to (ST55).

In this manner, in the component information recognition step described above, the recognition character string of the lot number which is the component information of all recognized components is output by data output unit 35b to host system 3 as the server together with board information 36b of board 7 on which the component is installed (data output step). In host system 3, the data is stored in trace database 3a as the trace data which is the production history information by component mounters M5 and M6.

The trace data stored in trace database 3a will be described with reference to FIGS. 11A to 11C. Trace data 50 indicates the production history of the mounting board as the manufacturing target and is created for each component mounting ling or each component mounter. As illustrated in FIG. 11A, trace data 50 includes data structure in which date of manufacture 52, product serial number 53, component name 54, lot number 55, and the like are linked to board ID 51 that specifies each produced board.

Date of manufacture 52 specifies year, month, and day when the board is manufactured. Product serial number 53 is a unique number assigned to the board. Component name 54 indicates the name of the component which is mounted on the board and corresponds to the component number at the time of component mounting. Lot number 55 is component information for specifying each component and is output from component mounters M5 and M6 in component mounting system 1 illustrated in the embodiment.

Trace data 50 is utilized as follows in a retroactive pursuit of a cause and an influence in a case of a product failure. When the failure occurs in an electronic equipment shipped to the market, the related state of the failure occurrence event and the cause of the failure are firstly investigated by a related department such as a manufacturer of the product. As a result, first, a causative component causing the failure is specified, and then the lot number corresponding to the causative part is specified.

If the causative component is specified in this way, a search for grasping spread and influence in the market of the failure is executed by the search function provided in host system 3, that is, component name 56a and lot number 56b are input as search key input item 56. The search result output 57 illustrated in FIG. 11C is obtained by the search. In search result output 57, search data 50\* in which date of manufacture 52 and product serial number 53 are linked to board ID 51 is obtained. With search data 50\*, the parties in the related department can grasp an actual condition of the failure in the market in each product base, and it is possible to devise effective troubleshooting measures.

As described above, component mounting system 1 illustrated in the embodiment is configured to include component mounters M5 and M6, and host system 3 as the server, and in which component mounters M5 and M6 are configured to include lot number recognizer 35a that recognizes the lot number by imaging the character of the lot number as the component information printed on the surface of component 20, and data output unit 35b that outputs the lot number recognized by lot number recognizer 35a as the trace data to host system 3 together with board information 36b of board 7 on which the component is installed. Therefore, it is possible to obtain the production history data without manually reading the identification information such as the bar code.

Component mounters M5 and M6 illustrated in the embodiment are configured to include storage unit 32 that stores component number character type information 37b for defining the kind of the character type of each digit of the regular component number, component number recognizer 34a that recognizes the component number by imaging the character of the component number applied to on the surface of component 20 and performing the recognition process of the captured character image of each digit based on component number character type information 37b stored in storage unit 32, regular component determinator 34b that determines whether or not component number character string 22 recognized by component number recognizer 34a matches with the regular component number, and installing heads 15A and 15B that install component 20 on board 7 in a case where it is determined that component number character string 22 matches with the regular component number by regular component determinator 34b.

Therefore, even in a case where there is a combination of numbers and alphabets that are morphologically similar and confusing in a case where a figure is written in the character to be recognized, it is possible to precisely recognize the part number and to prevent erroneous mounting.

In the embodiment, although a configuration, in which the character of the lot number and the character of the component number are captured and recognized in component mounters M5 and M6, is illustrated, a similar function may be applied to installation state inspection device M7 that performs the inspection of board 7 as the target after the component installation. Also in this case, it is possible to precisely recognize the part number and to prevent output of an erroneous inspection result.

The component mounting system and the trace data acquisition method the present disclosure have an effect that it is possible to acquire the production history data without manually reading identification information such as the bar code and are useful in the field of manufacturing the mounting board by mounting the component on the board.

What is claimed is:

1. A component mounting system comprising:
a component mounter; and
a server,
wherein the component mounter includes
a camera configured to image characters of component information printed on a surface of a component stored in a tape feeder,
a component information recognizer configured to recognize the characters of the component information in an image captured by the camera, and
a data output unit configured to output the component information together with board information to the server, the component information being recognized by the component information recognizer, the board information being information of a board on which the component is installed.

2. The component mounting system of claim 1,
wherein the component mounter includes a storage unit configured to store character type information defining a character type of each digit of the component information, and
wherein the component information recognizer recognizes the component information based on the character type information stored in the storage unit.

3. The component mounting system of claim 2,
wherein the character type information stored in the storage unit is input by a user.

4. The component mounting system of claim 2,
wherein, for each digit of the recognized component information, the component information recognizer sequentially extracts a plurality of candidates of an image of a character digit in accordance with a priority order given in advance in a process of recognizing the component information, and
wherein when a character type of a first candidate having a highest priority order among the plurality of candidates matches with the character type stored in the storage unit, the component information recognizer employs a character of the first candidate as the character of the image of the digit.

5. The component mounting system of claim 4,
wherein when the character type of the first candidate having the highest priority order among the plurality of candidates does not match with the character type stored in the storage unit, and the character type of a second candidate having the highest priority order next the first candidate among the plurality of candidates matches with a character type stored in the storage unit, the component information recognizer employs a character of the second candidate as the character of the image of the digit.

6. The component mounting system of claim 2,
wherein the character type includes at least numerals and alphabets.

7. The component mounting system of claim 1,
wherein the component information is a lot number.

8. The component mounting system of claim 1,
wherein the data output unit outputs information on date of manufacture together with the component information and the board information to the server.

9. The component mounting system of claim 1, wherein the component information comprises a component number and a lot number printed on the surface of the component stored in the tape feeder, and
the component information recognize is configured to recognize the component number and the lot number of the component stored in the tape feeder from an image captured by the camera.

10. The component mounting system of claim 1, wherein the camera is attached to a suction nozzle, facing in a same direction as the suction nozzle, and moves together with a movement of the suction nozzle.

11. A trace data acquisition method for acquiring production history data in a component mounting system including a component mounter and a server, the method comprising:
    a storage step of storing character type information defining a character type of each digit of regular component information;
    a component information recognizing step of recognizing the component information applied to a surface of a component by imaging a character of the component information printed on the surface of the component stored in a tape feeder and performing a recognition process of an image of the character of each digit of the recognized component information based on the character type information stored in the storage unit; and
    a data outputting step of outputting the component information together with board information to the server, the component information being recognized in the component information recognizing step, the board information being information of a board on which the component is installed.

* * * * *